Jan. 23, 1951 J. R. KITCHENS 2,539,021
COMBINED MOTOR TRUCK AND CONVEYER
Filed June 4, 1947 4 Sheets-Sheet 1
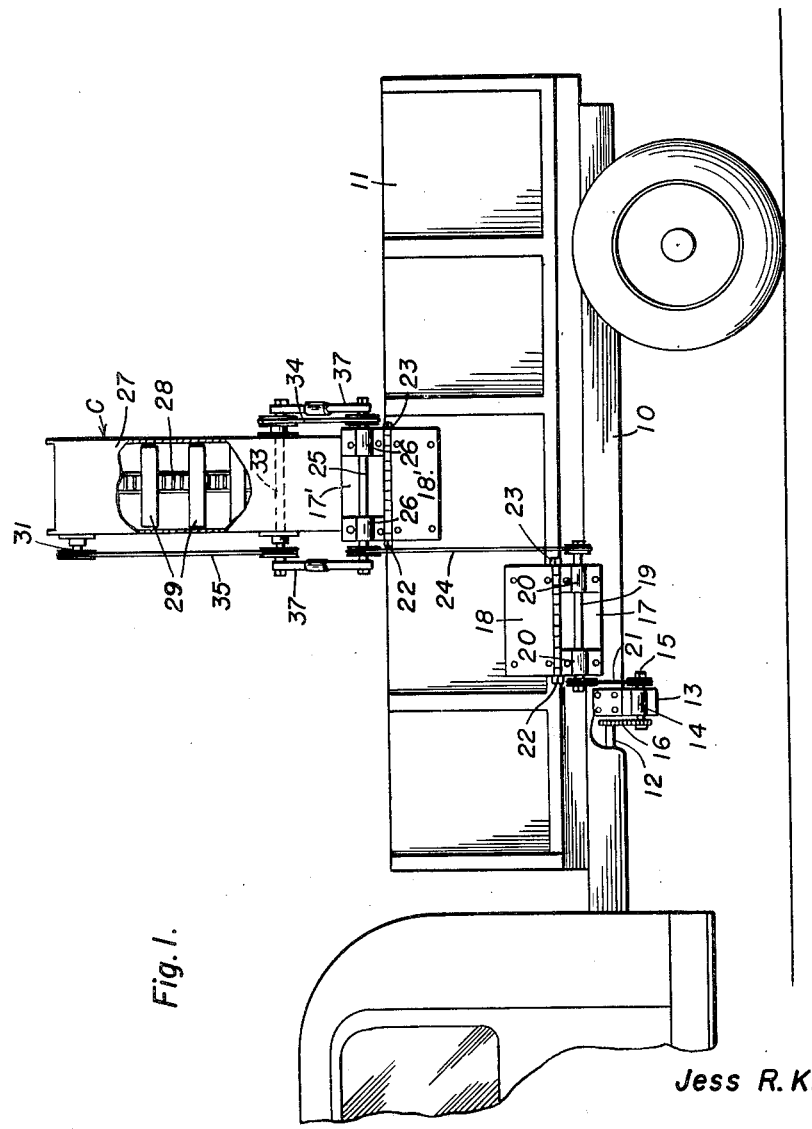
Fig. I.
Inventor
Jess R. Kitchens
By Clarence A. O'Brien
and Harvey B. Jacobson
Attorneys Jan. 23, 1951 J. R. KITCHENS 2,539,021
COMBINED MOTOR TRUCK AND CONVEYER
Filed June 4, 1947 4 Sheets-Sheet 2
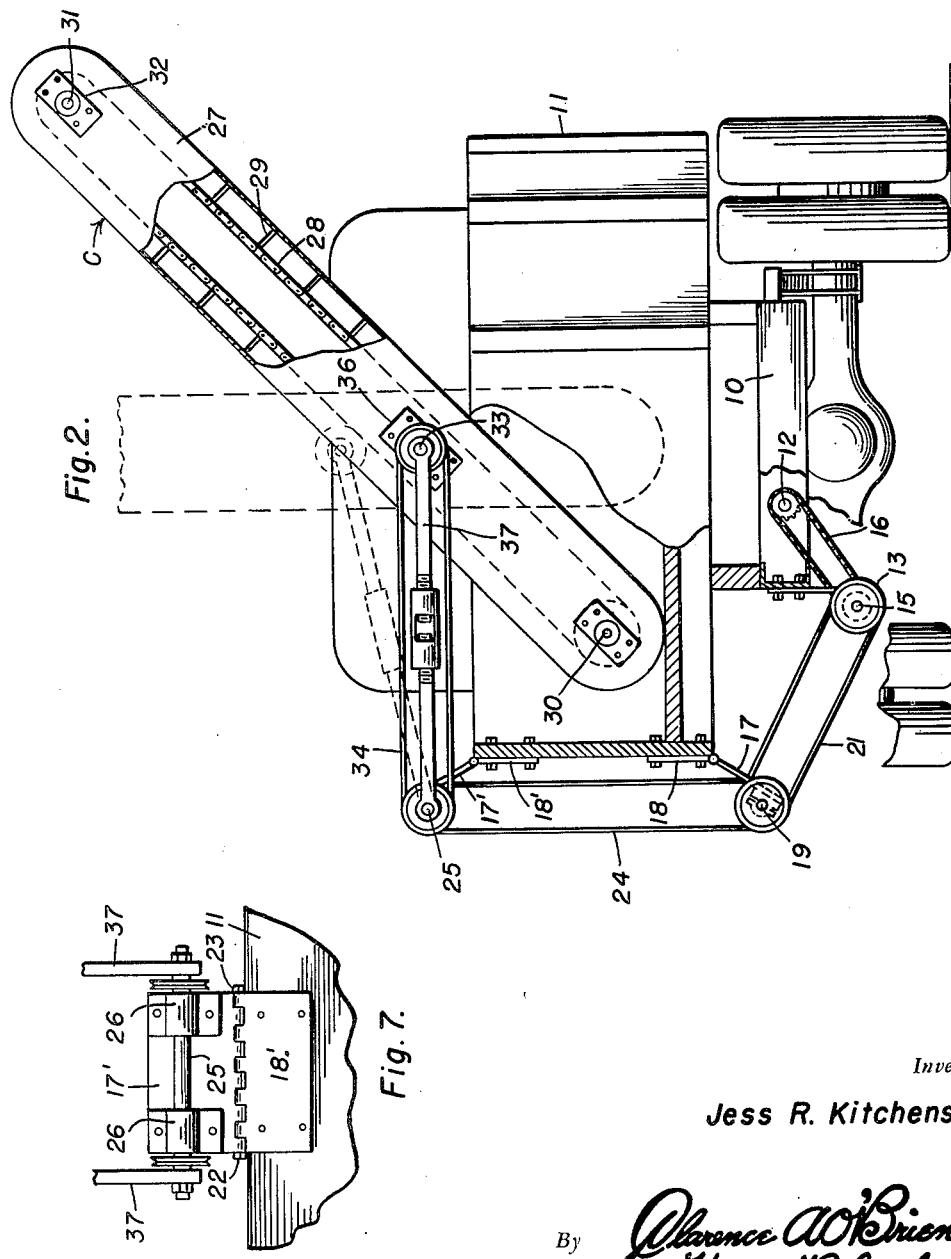
Inventor
Jess R. Kitchens

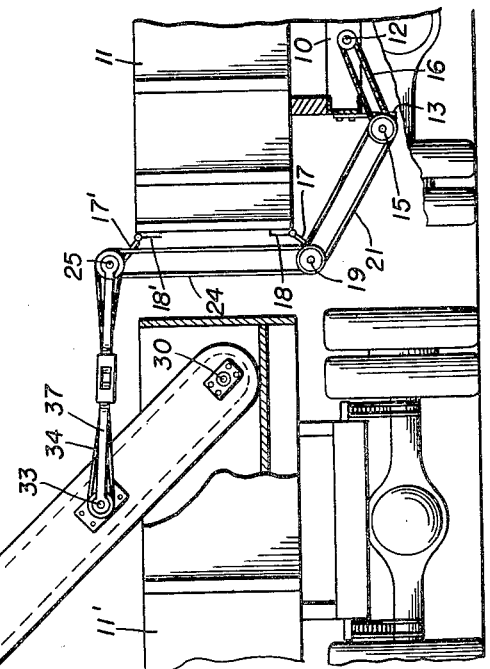
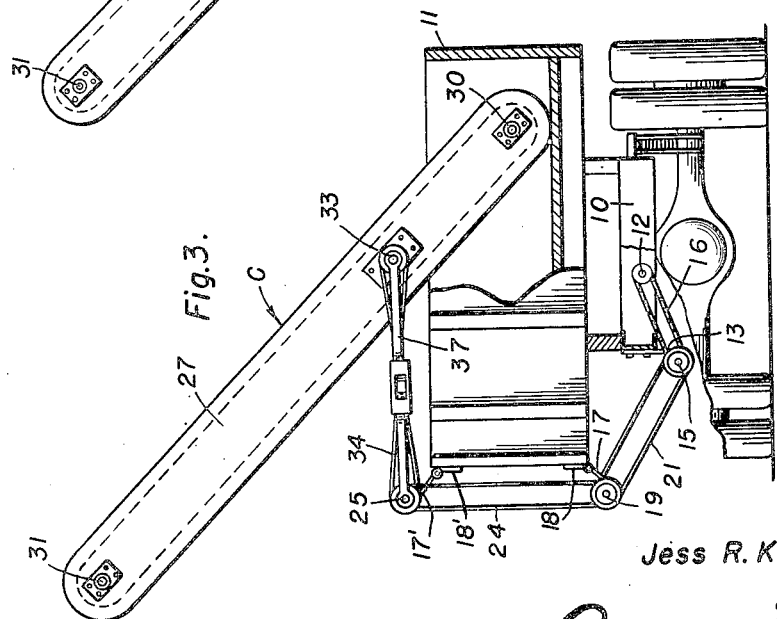

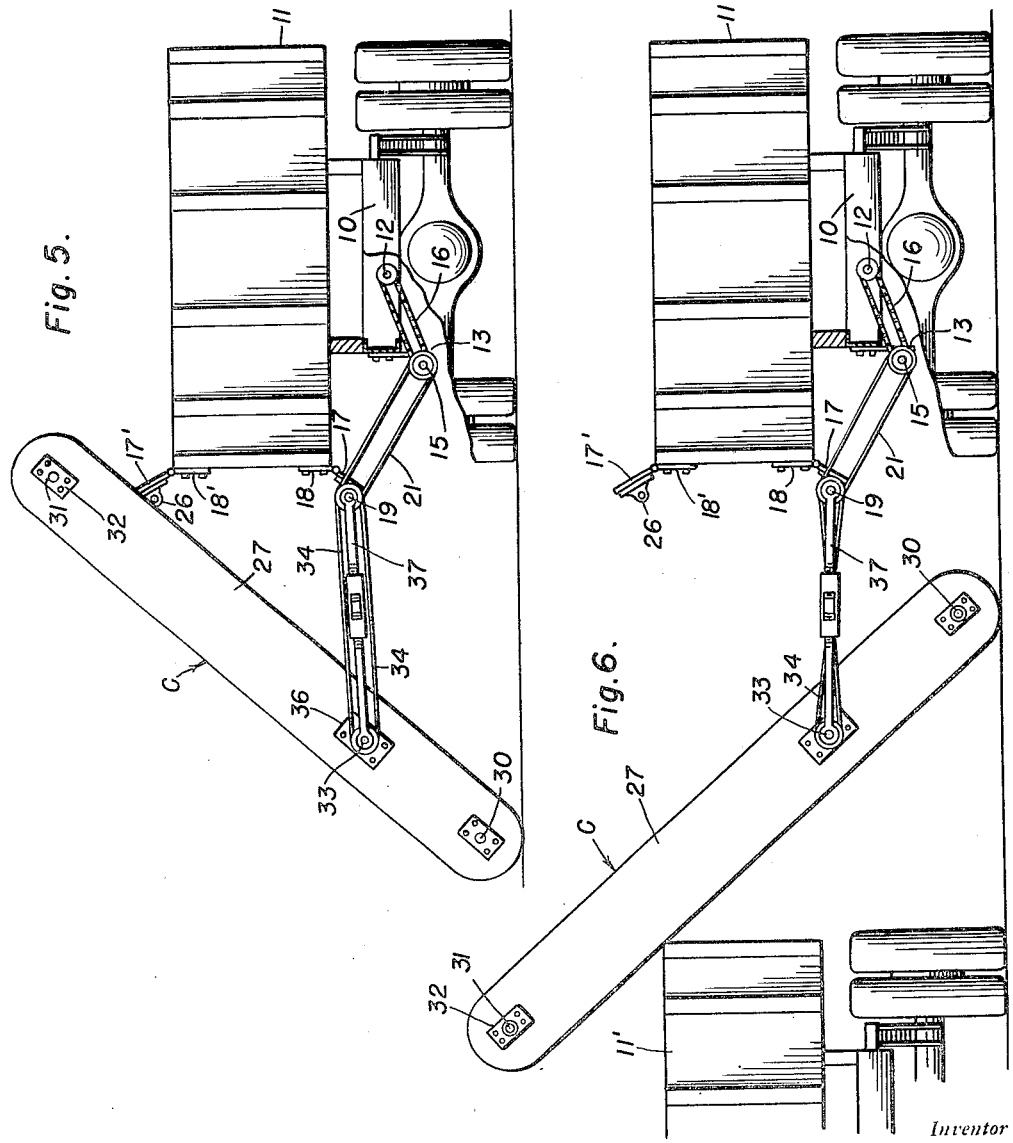

Patented Jan. 23, 1951

2,539,021

UNITED STATES PATENT OFFICE 2,539,021

COMBINED MOTOR TRUCK AND CONVEYER

Jess R. Kitchens, Duncan, Okla., assignor of thirty per cent to J. Bryan Driskill, Duncan, Okla.

Application June 4, 1947, Serial No. 752,530

4 Claims. (Cl. 214—83.26)

This invention relates to a combined motor truck and conveyor, and the primary object of the invention is to provide a motor truck with a conveyor driven from the power take-off shaft of the truck and bodily movable relative to the truck to different positions for delivering grain or other material from the body of the truck into a bin or the like at either side of the latter, for delivering the material from the ground into the body of said truck or an adjacent vehicle, or for delivering the material from the body of an adjacent vehicle into a bin or the like at one side of the adjacent vehicle.

A further object is to adjustably connect the conveyor with the body of the truck so that the conveyor may be readily disposed in different positions to effectively load or unload as desired, and so that the conveyor and its driving means will not interfere with movement of the body of a dump truck to which it may be applied, when ordinary dumping of a load from said body is desired.

Another object is to provide means for driving the conveyor that will be operable in various adjusted positions.

The exact nature of the present invention, as well as more specific objects and features thereof, will become apparent from the following description when considered in connection with the accompanying drawings, in which:

Figure 1 is a fragmentary side elevational view of a motor truck equipped with a conveyor in accordance with the present invention;

Figure 2 is an enlarged view, partly in rear elevation and partly in section, of the construction shown in Figure 1, but with the conveyor inclined to unload material from the truck body to one side of the truck;

Figure 3 is a view similar to Figure 2 but drawn on a reduced scale and showing the conveyor inclined to unload material from the truck body to the other side of the truck;

Figure 4 is a view similar to Figure 3, showing the conveyor in use for unloading material from the body of a vehicle located at one side of the truck equipped with said conveyor;

Figure 5 is a view similar to Figure 3, showing the conveyor in use for loading material from the ground into the body of the truck equipped with the conveyor;

Figure 6 is a view similar to Figure 4, showing the conveyor in use for loading material from the ground into the body of the vehicle located at one side of the truck equipped with the conveyor; and Figure 7 is an enlarged fragmentary elevation, showing details of the adjustable bracket mounted at the top of a side wall of the truck body.

In the drawings, I have shown the invention installed upon a motor truck having a chassis frame 10 on which is rigidly mounted a box-type body 11. However, the truck may have a dump body mounted and operated as disclosed in the U. S. Patent to Clifford A. Nesseth, No. 2,102,432, dated December 14, 1937, and the truck has a longitudinal power take-off shaft 12 similar to that shown at 26 in said patent and driven by the power plant of the truck.

At the side of chassis frame 10 which is adjacent the shaft 12, a depending bracket 13 is fixed to said chassis frame and has a bearing 14 at its lower end in which is journaled the intermediate portion of a countershaft 15. At the forward end, shaft 15 is operatively connected to power take-off shaft 12 by a chain and sprocket gearing 16. A second bracket 17 is hinged to the lower end of a plate 18 fixed to the bottom of the adjacent side of body 11 immediately to the rear of bracket 13, and a second countershaft 19 is journaled in bearings 20 carried by said second bracket 17. The rear end of shaft 15 is operatively connected to the forward end of shaft 19 by a belt gearing 21. Plate 18 and bracket 17 have interfitting hinge knuckles through which is passed a hinge bolt 22 having a nut 23 threaded on one end thereof which may be tightened to secure the bracket 17 in different positions of angular adjustment relative to plate 18 to tighten the belt of gearing 21.

A third bracket 17', similar to bracket 17, is hinged to the upper edge of a plate 18' fixed to the adjacent side of body 11 at the top of the latter and immediately to the rear of plate 18. This bracket 17' is hinged in the same manner as bracket 17 to be adjusted to different angular positions relative to plate 18' for tightening the belt of a belt gearing 24 provided between the rear end of the shaft 19 and a third countershaft 25 journaled in bearings 26 carried by said bracket 17'. It will be noted that, in case the body 11 is of the dump type, movement thereof may be freely permitted merely upon the removal of the belt of gearing 21. The hinge bolt and nut associated with bracket 17' and plate 18' are the same as those associated with bracket 17 and plate 18, and are indicated by similar reference characters.

The present invention also includes a conveyor C which embodies an elongated casing or chute 27 which is open at its ends and has an endless conveying element movable therein so that either end of the conveyor may be utilized as the intake or discharge end of the conveyor. The endless conveying element includes an endless chain 28 provided at intervals with transverse paddles 29 arranged to move along opposite longitudinal walls of casing or chute 27 and passing around sprocket wheels secured on the intermediate portions of transverse shafts 30 and 31 journaled in the ends of casing or chute 27. The endless conveying element may be maintained in a taut condition by adjustment of bearing brackets 32 for shaft 31 which are adjustable longitudinally of the casing or chute 27. Broadly considered, this conveyor is of a well known type and needs no further description herein. However, at a point between its ends and nearer one end thereof than the other, the conveyor has a transverse shaft 33 which extends through the sides of casing or trough 27 and between the runs of the endless conveying element 28, 29. One projecting end of shaft 33 is operatively connected with shaft 25 by a belt and pulley driving connection 34, while the other end of shaft 33 is operatively connected with shaft 31 by a belt pulley driving connection 35. Shaft 33 is journaled in bearings 36 which are adjustable longitudinally of casing or chute 27 for tightening the belt of driving connection 35, the adjustment of bearings 32 effecting tightening of chain 28. It will be seen that rotation of power takeoff shaft 12 is transmitted to the drive shaft 31 of the conveyor through chain gearing 16, and belt and pulley driving connections 21, 24, 34 and 35.

The conveyor C is connected with bracket 17' by means of links 37 which are adjustable in length to tighten the belt of driving connection 34. As shown, the links 37 are pivotally engaged at corresponding ends with the ends of shaft 33 and at their other ends with the ends of shaft 25, thus permitting disposition of links 37 at various angles relative to bracket 17' and disposition of conveyor C at various angles relative to links 37. The arrangement is such that the links 37 may be disengaged from shaft 25 and pivotally engaged with the ends of shaft 19 as shown in Figures 5 and 6, the belt 24 being dispensed with and shaft 33 being directly driven from shaft 19 by the belt of driving connection 34.

When the conveyor is not in use. it may be suitably propped in a vertical position within and upon the bottom of body 11 as shown by full lines in Figure 1 and by dotted lines in Figure 2. However, should it be desired to unload material from the body 11 of the truck into an adjacent bin or vehicle at one side of the truck, the conveyor may be moved to the laterally inclined position shown by full lines in Figure 2. The arrangement is such that the conveyor will be driven so that its endless conveyor element will have its lower run move upwardly within casing 27, providing a conveyor or elevator of the under-shot type. The material may be fed to the lower end of the conveyor by an operator located within the body 11 and shoveling the material to the conveyor. Should it be desired to unload the material from the truck body to the opposite side of the truck as shown in Figure 3, the conveyor will simply be tilted to incline in the opposite direction, but the belt of driving connection 34 will be crossed so that the endless conveying element of the conveyor will be driven in the opposite direction to thereby still provide a conveyor of the under-shot type.

As illustrated in Figure 4, the conveyor may be positioned within the body 11' of a vehicle arranged alongside the truck equipped with the conveyor, whereby to unload material from said adjacent vehicle into a bin at one side of the latter. For this purpose, the links 37 are simply swung about the shaft 25 so as to extend from the adjacent side of the motor truck toward and over the body 11' of the adjacent vehicle, the conveyor being disposed at an inclination within and upon the bottom of the body of said adjacent vehicle. In this use, the belt of driving connection 34 will be crossed to secure drive of the endless conveying element in the proper direction.

Whenever it is desired to load material from the ground into the body 11 of the truck or into the body 11' of an adjacent vehicle as respectively shown in Figures 5 and 6, the links 37 are disconnected from shaft 25 and engaged with shaft 19, the belt of driving connection 24 being dispensed with, and the belt of driving connection 34 being utilized to provide a drive between shaft 19 and shaft 33. When loading from the ground into the body of the motor truck as shown in Figure 5, the belt of driving connection 24 is not crossed, but when loading from the ground into the body 11' of an adjacent vehicle as shown in Figure 6, it is crossed. This is done to always drive the endless conveying element in the proper direction to secure an under-shot discharge of material from the conveyor. In the use of Figure 5 the upper portion of the conveyor is simply rested against the truck body 11 and the lower end of the conveyor rests upon the ground. In the use of Figure 6, the upper portion of the conveyor is rested against the side of the adjacent vehicle body 11' and the lower end of the conveyor is rested on the ground. The pivotal engagement of links 37 with shaft 19 and with shaft 33 permits disposition of the conveyor at the most efficient inclination. As shaft 12 may be thrown into or out of operation at will in a manner well known in the art, driving of the conveyor or cessation of such driving may be effected when desired. Any suitable provision may be made for supporting the conveyor in the inclined positions of Figures 2, 3 and 4.

From the foregoing description, it is believed that the construction, operation and advantages of the present invention will be readily understood and appreciated by those skilled in the art. Modifications and changes in details of construction are contemplated, such as fall within the scope of the invention as claimed.

Having described the invention, what is claimed as new is:

1. In combination with a motor truck including a chassis frame having a box-type body mounted thereon and having a longitudinal power take-off shaft beneath the body, a conveyor, a pair of links disposed parallel with and pivotally connected at corresponding ends to opposite sides of said conveyor between the ends of the latter, means to selectively pivotally connect the other ends of said links to a side of the truck body adjacent the top or bottom of the latter to respectively provide for location of the conveyor at an inclination within and upon the bottom of said truck body, location of the same at an inclination within the body of an adjacent vehicle, or location thereof at an inclination upon the ground beside the truck to respectively unload material from said truck body to either side of the truck, to unload material from an adjacent vehicle body into an adjacent bin, or to transfer material from the ground into said truck body or into an adjacent bin or vehicle, and means for driving said conveyor from said power take-off shaft in any of said locations.

2. In combination with a motor truck having a longitudinal power take-off shaft and including a chassis frame having a box-type body mounted thereon, a bracket fixed to one side of the chassis frame and having a countershaft journaled thereon, a driving connection between said power take-off shaft and said countershaft, a second bracket mounted on the lower portion of one side of the body and having a second countershaft journaled therein, a driving connection between said countershafts, a third bracket mounted on the upper portion of said side of the body and having a third countershaft journaled therein, a driving connection between said second and third countershafts, an elevating conveyor adapted to be disposed within and upon the bottom of the truck body and having a transverse shaft between its ends, links disposed parallel with and at opposite sides of the conveyor and pivotally connecting said transverse shaft to said third countershaft and providing for disposition of the conveyor in positions laterally inclined toward and beyond either side of the truck body, driving connections between the third countershaft and said transverse shaft, a driving connection between said transverse shaft and the conveyor, said driving connection between the second and third countershafts including a removable driving element therebetween, said links being detachable from the third countershaft and attachable to the second countershaft to provide for positioning of the conveyor in inclined positions while resting on the ground beside the truck for loading material from the ground into the body of the truck or into a vehicle or bin at one side of the truck.

3. The construction defined in claim 2, wherein the driving connection between the third countershaft and the transverse shaft of the conveyor is conditionable to reverse the direction in which the conveyor is driven.

4. The construction defined in claim 2, wherein said driving connections between the first and second and the second and third countershafts include driving belts, said second and third brackets being adjustable to tighten said driving belts.

JESS R. KITCHENS.

REFERENCES CITED

The following references are of record in the file of this patent:

UNITED STATES PATENTS

| Number | Name | Date |
|---|---|---|
| 1,448,835 | Egger | Mar. 20, 1923 |
| 1,515,328 | Barkmann et al. | Nov. 11, 1924 |
| 1,841,525 | Evensen | Jan. 19, 1932 |
| 2,419,824 | Davis | Apr. 29, 1947 |

FOREIGN PATENTS

| Number | Country | Date |
|---|---|---|
| 305,784 | Great Britain | Feb. 14, 1929 |